US006694586B1

(12) United States Patent
Goop

(10) Patent No.: US 6,694,586 B1
(45) Date of Patent: Feb. 24, 2004

(54) PRESS TOOL FOR CONNECTING WORKPIECES BY COLD FORMING

(75) Inventor: Hans-Joerg Goop, Schellenberg (LI)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/695,401

(22) Filed: Oct. 25, 2000

(30) Foreign Application Priority Data

Oct. 26, 1999 (CH) ............................................ 1951/99
Apr. 20, 2000 (DE) ........................................ 100 19 701

(51) Int. Cl.[7] ................................................ B23P 19/04
(52) U.S. Cl. ............................ 29/234; 29/237; 29/272; 29/282; 29/283.5; 29/33 T
(58) Field of Search ..................... 29/890.037, 890.036, 29/508, 516, 517, 33, 234, 237, 272, 282, 407.1, 283.5; 72/292, 402; 269/239, 268, 287

(56) References Cited

U.S. PATENT DOCUMENTS

| | | | | |
|---|---|---|---|---|
| 3,859,837 | A | * | 1/1975 | Burroughs |
| 3,889,354 | A | * | 6/1975 | Nishi et al. |
| 4,426,761 | A | | 1/1984 | Sassak |
| 5,007,667 | A | * | 4/1991 | Unewisse et al. |
| 5,025,546 | A | * | 6/1991 | Gotoh et al. |
| 5,377,400 | A | * | 1/1995 | Homm |
| 5,697,135 | A | | 12/1997 | Dischler |
| 5,836,070 | A | | 11/1998 | Arena |
| 6,378,194 | B1 | * | 4/2002 | Nghiem |
| 6,405,411 | B1 | * | 6/2002 | Allemann et al. |
| 6,434,998 | B2 | * | 8/2002 | Amherd |
| 6,477,757 | B2 | * | 11/2002 | Viegener |

FOREIGN PATENT DOCUMENTS

| | | | | |
|---|---|---|---|---|
| DE | 42 40 427 | C1 | | 1/1994 |
| DE | G 93 14 054.1 | U1 | | 1/1994 |
| DE | 297 21 759 | U1 | | 5/1998 |
| DE | 197 34 355 | C1 | | 4/1999 |
| EP | 0 627 273 | A2 | | 12/1994 |
| EP | 0 922 537 | A2 | | 6/1999 |
| GB | 2048413 | | * | 12/1980 |

* cited by examiner

*Primary Examiner*—Gregory Vidovich
*Assistant Examiner*—Eric Compton
(74) *Attorney, Agent, or Firm*—Howrey Simon Arnold & White LLP

(57) ABSTRACT

The invention relates to press tools for the connection, by cold forming, of tubular workpieces (2, 3) whose connection regions are provided with circular external cross-sectional shapes and are pushed one into the other. The press jaws (10) of the press tool have, in the closed state, approximately the external cross-sectional shape of the workpieces and can be provided with recesses (13, 17). Such a press tool may also have only two press jaws (10) and one bearing bolt (4). As a result of drive forces (F) introduced into the tool, cold-forming forces are exerted on the workpieces (2, 3) via said tool. Depending on manufacturing tolerances of the workpieces (2, 3), the distance (A) between the press jaws (10) varies.

18 Claims, 3 Drawing Sheets

PRESS TOOL FOR CONNECTING WORKPIECES BY COLD FORMING

CROSS-REFERENCE TO RELATED APPLICATIONS

This application claims the benefit of European Patent Application No. EP20000123080, filed Oct. 24, 2000; German Patent Application DE200001019701, filed Apr. 20, 2000; and Swiss Patent Application CH19990001951, filed Oct. 26, 1999.

BACKGROUND OF THE INVENTION

1. Field of the Invention

The invention relates to a press tool and a method for connecting by cold forming.

Such press tools are also known as press chains, press loops or press rings and are used in particular for connecting pipe sections. For this purpose, the pipe ends to be connected are pushed into a deformable sleeve, a so-called press fitting. For connecting by cold forming, the press jaws are first placed around the press fitting in the manner of a collar that remains open in one area, the two chain ends of the press tool being opposite one another across the open area. The introduction of the drive forces causes the two chain ends to be drawn together. Consequently, the insides of the press jaws are moved together as far as they will go to form an annular press space, and the cold-forming forces are transmitted to the press fitting. To ensure radial cold forming of the fittings that is as uniform as possible, at least three press jaws, generally arranged in the manner of a chain, are typically used for connecting pipes with a diameter greater than 54 mm by cold forming.

2. Description of Related Art

European patent EP627,273 describes a press tool comprising more than two press jaws that are partially movable in a connecting link guide in the circumferential direction. As a result, the press jaws are arranged uniformly over the circumference of the press fitting, which thus permits a uniform radial distribution of the forming forces and prevents flash formation between the press members.

As described in EP627,273, press tools for cold-formed pipe connections having relatively large external cross-sectional diameters, in particular for pipe systems with high internal pressure stresses, require more than two press jaws. More than two press jaws help prevent "run-out" of the press fittings or formation of a flash between the end faces of the press jaws on closing the press tool. Run-out of the fittings or formation of a flash makes complete closing and consequently reliable connection impossible.

Such press tools are described, for example, in German Patent DE4,240,427 and European Patent EP992,537. Such tools also available in so-called self-holding versions, which move together even before the introduction of the drive forces. Such tools move together prior to the introduction of the drive forces by pretensioning forces exerted by spring elements. These tools, therefore, need not be additionally held on the workpiece, for example with a hand, to prevent slipping or falling down from the connecting point.

SUMMARY OF THE INVENTION

It is an object of the present invention to provide a press tool that is easy to handle, has a simple design and can be used flexibly. The present invention also includes a method for connecting, by cold-forming, workpieces that are inserted one into the other. The method of the present invention permits safe and reliable connection of workpieces having relatively large external cross-sectional shapes and facilitates connections with relatively extensive cold forming. Such press tools should preferably be capable of being used even where there is limited space and should, if necessary, surround, in a nonfrictional manner, the workpieces to be connected.

A press tool according to the present invention is preferably formed with at least two arms, the press jaws advantageously also being used for transmitting the drive forces introduced. The press jaws must be capable of being moved toward one another, the connection of ends of the press jaws by means of bearing bolts having proven a simple and reliable connection concept in terms of design.

The cold-forming forces exerted by the press jaws on the workpieces are initiated by drive forces introduced into the tool. For the introduction of drive forces, engagement regions such as recesses, holes, projections, eyes, hooks, etc. should be provided in at least one area of the press tool. These can be provided at the non-bearing ends of press jaws for application of a drive means that can be optionally coupled.

When, for example, optionally tubular workpieces having predetermined, in particular circular, external cross-sectional shapes are mentioned, it is always to be understood as meaning workpieces having connection regions formed in this manner.

A press tool according to the present invention preferably exerts the cold-forming forces via the insides of the press jaws on the workpieces in a manner such that, when the press jaws move toward one another, "run-out" of the outer workpiece and thus the formation of a flash between the press jaws are substantially prevented. To prevent the ends of the inside edges of the press jaws from cutting into the workpiece thus causing the formation of flash, widening recesses in the form of bevels angled outward (i.e., widening toward the end faces) are provided at least on one side (optionally on both sides) in those regions of the insides of the press jaws that are adjacent to the end faces. The insides of the press jaws may be both angled outward toward the end inside edges and may also be convex. Optionally, the insides of the press jaws may be gradually increasingly curved toward the inside edges, turning outward. The optionally angled insides of the press jaws beveled outward may be in the form of insertion bevels adjacent to the end inside edges. These angled insertion bevels are preferably flat but may also be slightly concave, depending on the machining. If the insertion bevels are slightly concave, their curvature is less pronounced than that of the remaining inside of the press jaw. In particular, the insertion bevel have a curvature that is less pronounced than that of a lateral surface segment of a rotational body, and optionally also smaller than the external cross-sectional diameter of the outer workpiece before the cold forming. The curvature of the inside regions of the press jaws adjacent to the inside of the insertion bevels at least approximately corresponds to the remaining external cross-sectional diameter of the cold-formed workpiece.

As a result of these features, the insertion bevels of the insides of the press jaws are shaped at their end inside edges in such a way that, when placed on the workpiece, the insides do not rest on the end inside edges but lie on the outer lateral surface of the workpiece under their inside surface, optionally tangentially, optionally a distance away from the end inside edges.

The extent of the outward angling of the outer end inside regions depends on the external cross-sectional diameter of the respective workpieces coordinated with the press tool. In the case of external cross-sectional diameters between 54 mm and 108 mm, the insertion bevels may be angled, for example, at an angle of 5 to 250 degrees outward relative to the lateral surface directly adjacent to it.

At least two press jaws are required for the operation of a press tool according to the invention. The two press jaws can be mounted around a common bearing bolt, the baring bolt optionally being eccentric. An eccentric bearing bolt results in those end faces of the press jaws that are not on the bearing side experiencing an additional translational movement apart when the press tool is opened. Consequently, the required opening angle for surrounding the workpieces and the spacing of the end faces in the initially clamped state of the tool can be reduced.

The two press jaws can also each be individually mounted by means of two bearing bolts held in a bearing holder. Once again, at least one bearing bolt can optionally be eccentric. The two bearing bolts can be mounted in the bearing holder both rigidly and coupled to one another. For example, it is possible to provide for each bearing bolt, for relative displacement in he bearing holder, a guide slot along which the bearing bolts are displaceable, and optionally the bearing bolt can be connected via a guide rod system.

The eccentric formation of the bearing bolts and the individual mounting of the press jaws are also suitable for those embodiments in which the insides of the press jaws do not have lateral surface segments of rotational bodies, i.e., the press tool in the closed state encloses a polygonal or oval space instead of an annular space.

To facilitate the placing of the press tool around the workpieces to be connected, and in particular to prevent said press tool from falling down before the mounting of a drive means that can be optionally coupled, it is advantageous to provide the press tool with means that exert pretensioning forces in the closing direction. At least one means exerting pretensioning forces in the closing direction is required for the self-holding operation of a press tool. Said means can be arranged both between the individual press jaws and/or can pass around the press tool in the manner of a clamp open on one side.

Because, on the one hand, the means exerting the pretensioning forces must firmly clamp the press tool onto the workpieces in a non-slip manner and, on the other hand, the press tool should nevertheless be easy to open and to place around the workpieces, means exerting pretensioning forces that have relatively large spring travels are advantageous. This favors coil springs over leaf springs or bar springs, especially in the case of press tools in which the opening of the tool requires large relative movements of few parts. Suitable means exerting pretensioning forces are in principle various components of different, elastically deformable materials. Metallic springs are preferred, but means comprising rubber-like materials, such as tensioning bands or extensible plastics, are also possible. They can be mounted between the press jaws and/or around these, on the outside. Coil springs that are wound around bearing bolts and whose spring ends each exert pretensioning forces on a press jaw permit simple design solutions in combination with convenient handling.

The shape of the insides of the press jaws of the press tool is not limited to lateral surface segments of rotational bodies having identical radii of curvature. If the workpieces are not rotationally symmetrical in the connection region but, for example, have an ellipsoidal, polygonal or irregular shape, or if it is to be converted into such a shape, other embodiments of the insides that are correspondingly adapted to the external cross-sectional shape of the workpieces are possible.

To assist the positioning and guidance of the press tool on workpieces, it is also possible for protuberances and/or recesses, such as, for example, notches or grooves, to be arranged on the insides of the press jaws optionally around the entire inside.

Because the press jaws can have a very narrow design and can be substantially freely pivotable about their bearing bolts, the press tool according to the invention is not only simple and easy to place around workpieces but is also particularly suitable where space is limited, for example in the case of installation in walls and ceilings and in corners.

An inventive, cold-forming connection method for two workpieces pushed partly one into the other and having a predetermined, in particular circular, external cross-sectional shape takes into account the given manufacturing tolerances of the workpieces to be connected in the connection region. Because of the tolerances of the fittings, sockets and pipes, especially in the case of the large nominal connection diameters ND (50 to 100 mm), the required drive forces for moving together the press jaws of a press tool of the prior art to give a closed press space can vary considerably. Consequently, the drive apparatuses and tools have been dimensioned according to the maximum forces occurring. In contrast, the insides of the press jaws of a press tool according to the present invention are formed in such a way that a reliable cold-forming connection is reliably achieved on reaching a predetermined force, even when a tool is not closed. In cooperation with a drive apparatus that can apply specifically predetermined drive forces to the tool for the respective connection processes, controlled connections by means of lighter and more flexible tools and drive apparatuses are possible.

BRIEF DESCRIPTION OF THE DRAWINGS

The invention is described in more detail below, purely by way of example, with reference to embodiments shown in the drawing.

DETAILED DESCRIPTION OF THE INVENTION

Figure 1:
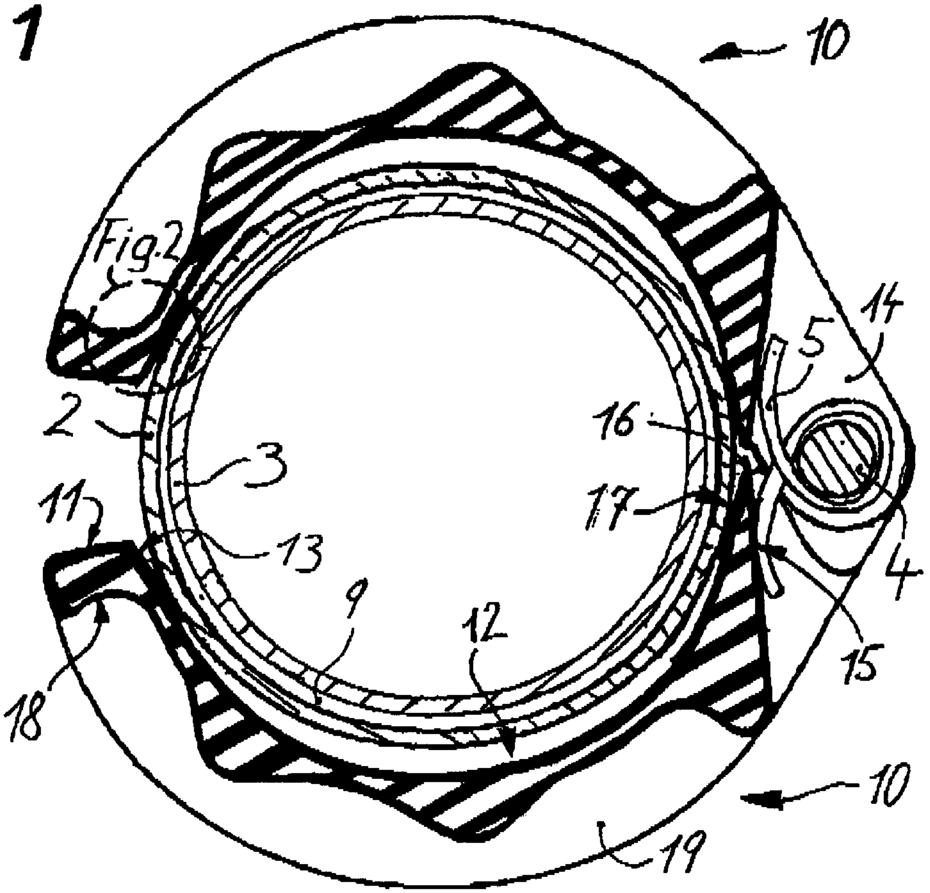
FIG. 1 shows a cross-section through a press tool according to the present invention that surrounds two workpieces to be connected.

FIG. 1 shows a tubular fitting 2 that is partly pushed onto a pipe 3 having a circular external cross-section. Because of manufacturing tolerances, a space 9, which differs in size in each case, is present between the fitting 2 and the pipe 3. The fitting 2 may be a red brass fitting or may be produced from a corresponding blank by cutting. A press tool according to the present invention has two press jaws 10, a coil spring 5 and a bearing bolt 4. The press tool surrounds the fitting 2 and, pretensioned by the coil spring 5, rests on the fitting 2 in the pretensioned state. The press jaws 10 are formed essentially identically, with mirror symmetry. They have identical features with identical functions and reference numerals.

Figure 3:
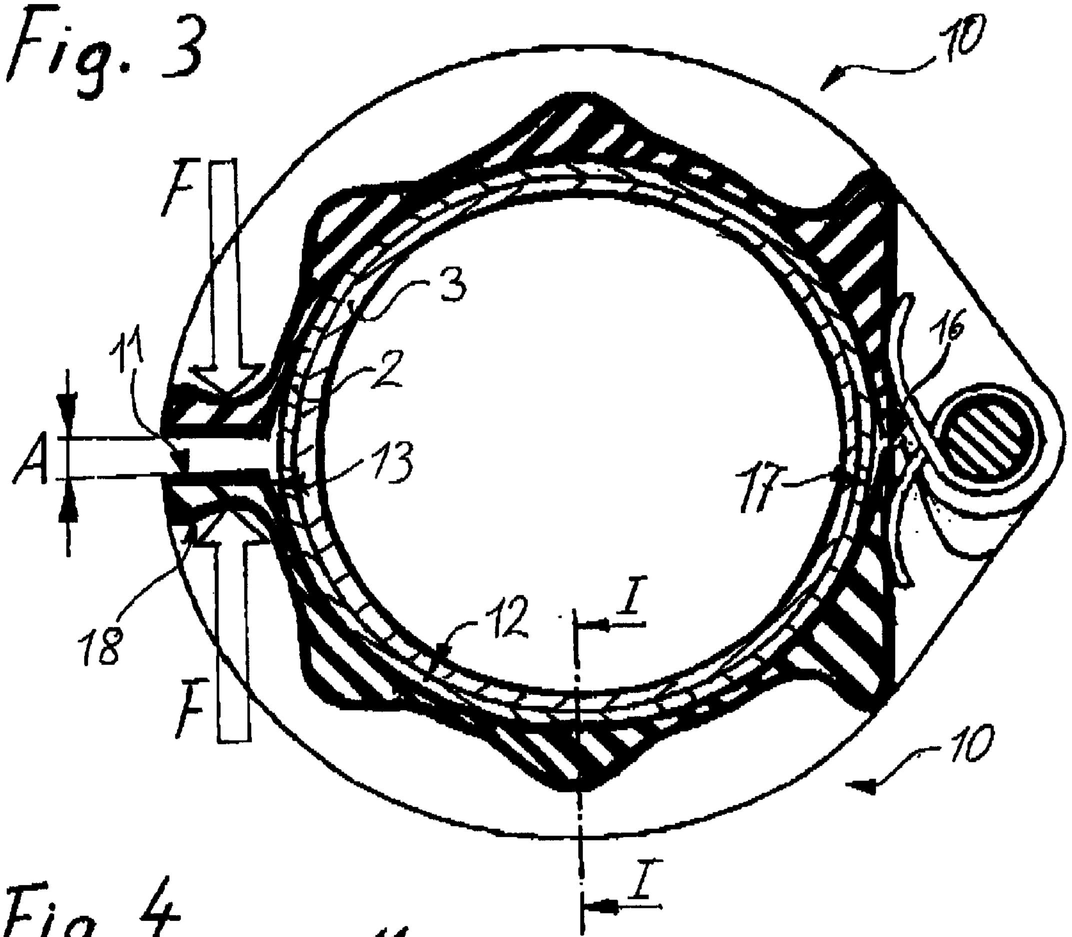
FIG. 3 shows a cross-section through the press tool and the workpieces from FIG. 1, to which drive forces are applied.

The press jaw 10 is semicircular. On one end face 16 of the press jaw 10, which is on the bearing side, are bearing plates 14, optionally arranged in pairs and symmetrical with respect to the central plane, which is provided with a bearing hole. An end face 11, which is not on the bearing side, forms the other end of the arc-shaped press jaw 10. In the region of the end face 11, the press jaw 10 has an engagement region 18, directed towards said end face, for the introduction of drive forces F (as shown in FIG. 3). An introduction region 15 adjacent to the end face 16 is provided for introducing pretensioning forces by a spring end of the coil spring 5 into the press jaw 10. For better guidance of the spring end, the introduction region 15 can be provided with a groove.

Two side walls 19, mounted parallel and acting as stiffening ribs, impart additional rigidity to the press jaw 10. The press jaw 10 has an inside 12 whose surface is determined by one lateral surface half of a rotational body or by two bevels 13 and 17. Embodiments having only one bevel or entirely without bevels (FIG. 5), are also possible, in particular for connections of medium-sized and smaller external cross-sectional shapes.

In a manner known per se, the bearing plates 14 are mounted, offset from one another in each case, on those end faces 16 of the two press jaws 10 which are on the bearing side, so that the bearing holes of all bearing plates 14 can be aligned coaxially with one another. The bearing bolt 4 inserted into the aligned bearing holes connects the two press jaws 10 to one another in a manner such that they are rotatably mounted. This permits the press tool to surround the fitting 2. The coil spring S wound in a plurality of turns around the bearing bolt 4 introduces, via each of its two spring ends, pretensioning forces into the introduction regions 15 of the two press jaws 10. Consequently, the two press jaws 10 rest on the fitting 2 in a nonfrictional manner and secure the press tool so as to prevent it from slipping off or falling down.

Figure 2:
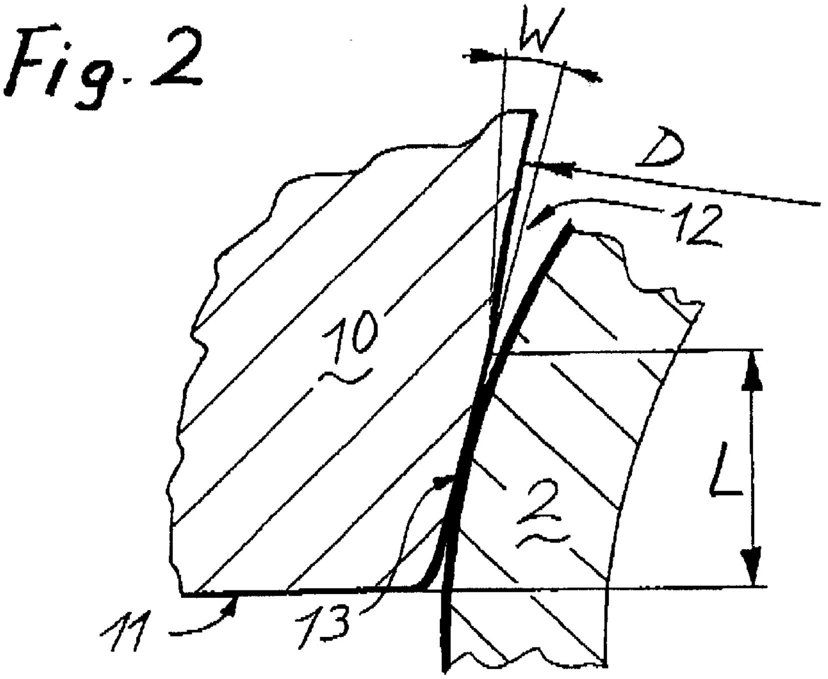
FIG. 2 shows an enlarged cut-out of a press jaw of the press tool from FIG. 1.

FIG. 2 is an enlarged cut-out of FIG. 1 and shows a possible embodiment of the inside 12 of the press jaw having inventive bevels. The inside 12 is in the form of a lateral surface half of a cylinder of diameter D. In this lateral surface half, a bevel 13 not on the bearing side is provided in that region of the inside 12 that is adjacent to the end face 11 not on the bearing side. The bevel 13 not on the bearing side widens toward this end face 11. The bevel 13 not on the bearing side is provided over a length L on the lateral surface shape of the inside 12 and is inclined at an angle W relative to this lateral surface. The region not shown in FIG. 2 and adjacent to the end face 16 on the bearing side may have a bevel 17 that is formed identically and with mirror symmetry and is located on the bearing side. The edges of the bevels 13 and 17 with the end faces 11 and 16 can be provided with a radius. This facilitates sliding of the press tool 1 onto the fitting 2. In the pretensioned state, the bevels 13 and 17 of the tool rest on the fitting 2.

Dimensions of the diameter D, of the angle W and of the length L for an embodiment of press jaws 10 according to the invention for the nominal diameters ND (German standard) 40, 50, 65, 80, 100, 2½" , 3" and 4" from the system supplier "Viega, Franz Viegener II, D-57428 Attendorn" and also for the nominal diameters ND 40, 50, 65, 80 and 100 from the system supplier "mapress, Mannesmann Pressfitting-System, D-40764 Langenfeld", which have proven suitable for connections by cold forming using a press tool corresponding to the embodiment in FIG. 1, are tabulated below purely by way of example.

TABLE

D, W and L as a function of the nominal diameter ND, pipe and fitting

| Nominal Diameter [ND] | Pipe [material] | Fitting [material] | Diameter D [mm] | Angle W [360°] | Length L [mm] |
|---|---|---|---|---|---|
| 40 | Stainless St./ Cu | Stainless St., red brass/Cu | 51.9 | 7.5 | 2–3 |
| 50 | Stainless St./ Cu | Stainless St., red brass/Cu | 63.9 | 8.5 | 3–4 |
| 65 | Stainless St./ Cu | Stainless St., red brass/Cu | 76.1 | 12.5 | 4–8 |
| 80 | Stainless St./ Cu | Stainless St., red brass/Cu | 102.0 | 12.5 | 4–8 |
| 100 | Stainless St./ Cu | Stainless St., red brass/Cu | 121.0 | 15.0 | 4–8 |
| 2½" | Stainless St./ Cu | Stainless St., red brass/Cu | 78.0 | 12.5 | 4–8 |
| 3" | Stainless St./ Cu | Stainless St., red brass/Cu | 91.5 | 12.5 | 4–8 |
| 4" | Stainless St./ Cu | Stainless St., red brass/Cu | 116.5 | 15.0 | 4–8 |

FIG. 3 shows the pipe 3, the fitting 2 and the press tool from FIG. 1 in the driven state. Drive forces F are introduced into the press tool by a drive means not shown in FIG. 3. The drive means can be coupled, for example, via the engagement regions 18 of the press jaws 10. Starting from the pretensioned state of FIG. 1, the press jaws 10 move toward one another. The bevels 13 and 71 rest on the surface of the fitting 2 and exert forming forces on the fitting 2. Between the edges, there is a certain latitude between the end faces 11 and 16 and the bevels 13 and 17 and the surface of the fitting 2. This essentially prevents the formation of a flash between the opposite end faces 11 and 16.

As a result of the forming forces exerted by the press tool, the fitting 2 is essentially formed into an oval shape until it touches the lateral surface halves of the insides 12 of the press jaws. As a result of the further movement of the press jaws 10 toward one another, the fitting 2 is further formed until it rests completely against the lateral surface halves. Since its diameter ID (FIG. 2) is smaller than the external diameter of the fitting 2, material of the fitting 2 flows toward the pipe 3 during these forming operations. During a further movement of the press jaws 10 toward one another, in addition to the material that flows into the bevels 13 and 17, further material flows inward and exerts compressive forces radially on the pipe 3. The pipe 3 is now reliably connected to the cold-formed fitting 2. During a further movement of the press jaws 10 toward one another, the drive forces F now increase disproportionately even if the press jaws 10 still do not touch one another with their end faces not on the bearing side and are a distance A apart. For given drive forces F, the distance A is dependent on the manufacturing tolerances of the dimensions in the connecting region of the fitting 2 and of the pipe 3.

The cold-forming connection method for workpieces pushed partly one into the other according to the present invention is based on this state of affairs. In contrast to the press tools of the prior art, for reliable connection of the workpieces the drive forces do not continue until the press jaws have touched one another, but the press jaws 10 are moved toward one another until the drive forces F have reached a predetermined magnitude. A drive means corresponding to the present invention therefore has an adjustable means regulating the maximum drive forces F. This is in contrast with designs of the prior art, which, for example, include only one mechanical pressure relief valve designed for a specific maximum pressure and guarantees only a constant upper limit of the magnitude of the drive forces.

As can easily be seen, the diameter D (FIG. 2) must be tailored to those extreme values of the manufacturing tolerances of the dimensions of the workpieces that influence the cold-forming connection in such a way that a reliable cold-forming connection is always guaranteed, both when the end faces 11 approach until they reach a distance A and when the end faces 11 touch one another. As an example, the distance A is typically about 1 mm +/− 1 mm in the case of a connection of a red brass fitting with a stainless steel pipe having a nominal diameter of 108 mm using a tool that essentially corresponds to the embodiment shown in FIG. 1. The drive forces required for the cold forming are on the order of about 32 kN.

Figure 4:
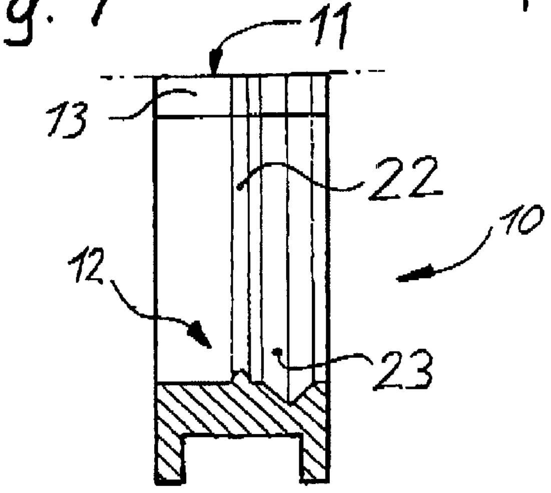
FIG. 4 shows a radial section through an embodiment of the inside of a press jaw.

FIG. 4 shows a radial section along the line I—I of FIG. 3, with the direction of view in the direction of the arrow, through a possible embodiment of a press jaw 10. Depending on the design, the inside 12 may have an all-around semitoroidal protuberance 22 or an all-round notch 23. The inside 12 is determined by a lateral surface segment of a rotational body. The protuberance 22 and the notch 23 are continued in the region of the bevels 13, parallel to the latter. The semitoroidal protuberance 22 assists the positioning and the guidance of the press jaw 10 on a corresponding fitting 2 during the cold-forming connection. The notch 23 is provided for a possible recess in the fitting 2.

Figure 5:
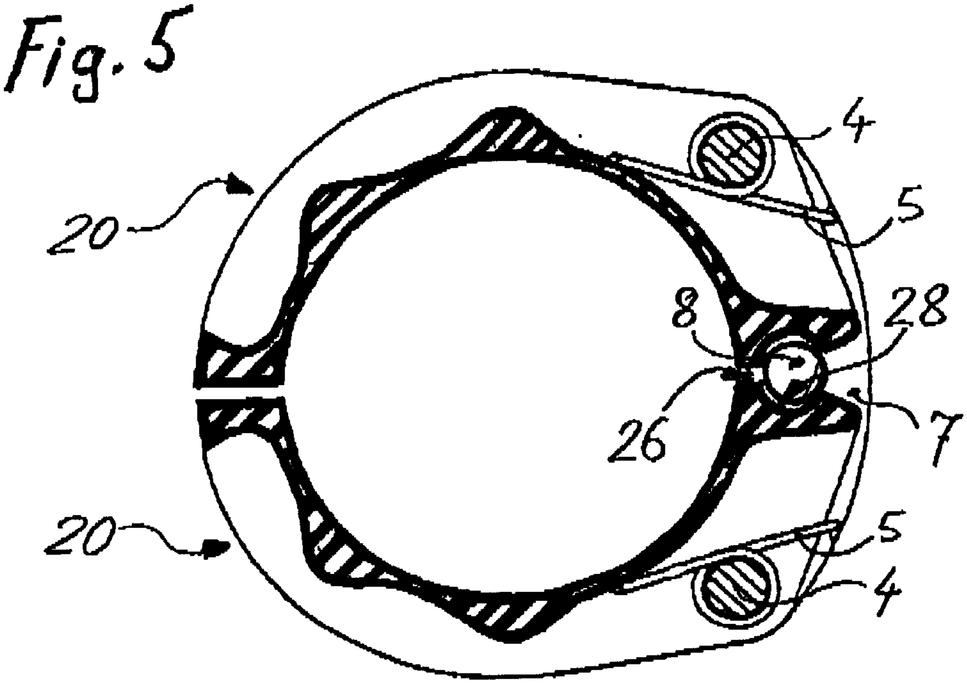
FIG. 5 shows a cross-section through an embodiment of a press tool according to the invention, having two bearing bolts.

FIG. 5 shows a further embodiment of a press tool according to the invention, whose two individually mounted press jaws 20 formed with mirror symmetry are each individually rotatably mounted by means of two bearing bolts 4. The two bearing bolts 4 are in turn held in a manner known per se by two bearing holders 7 identically formed with mirror symmetry. The bearing holders 7 mounted on either side of the individually mounted press jaws 20 are each provided with two bearing holes. In the plane of symmetry between the two bearing bolts 4, the bearing holders 7 have guides for a roller 8 on their inside. The roller 8 engages in each case a semicylindrical recess 28 in the end face 26, on the bearing side, of both individually mounted press jaws 20 and thus forces symmetrical opening of this press tool. Optionally, embodiments having bevels (FIG. 2) are to be considered, especially for tools for large connection diameters. Two coil springs 5, which are identically formed with mirror symmetry and wind around the bearing bolts 4, introduce into the individually mounted press jaws 20 pretensioning forces that position the press tool in a self-holding manner on a fitting..

Figure 6:
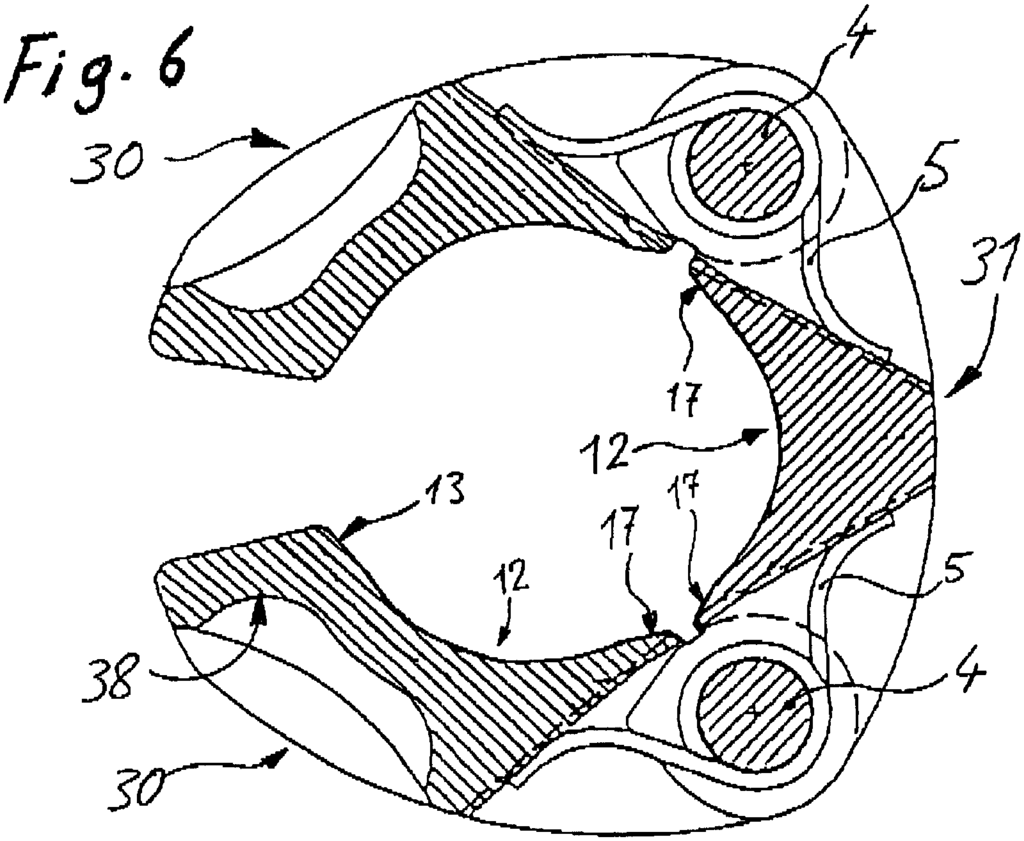
FIG. 6 shows a cross-section through an embodiment of a press tool according to the invention, having three press jaws.

FIG. 6 shows a further embodiment of a press tool according to the invention, which has three press jaws connected to one another in a chain-like manner. Two arc-shaped end jaws 30, formed identically with mirror symmetry, are connected at one end to the ends of a third arc-shaped middle jaw 31 by means of two bearing bolts 4 in a manner known per se and thus rotatably connected to one another. In that end region of the end jaws 30 that is not on the bearing side, engagement regions 38 for introducing drive forces F are provided, analogously to the press jaws 10 in FIG. 1. The end jaws 30 and the middle jaw 31 may have essentially identical insides 12 with lateral surface segments of rotational cylinders, provided with bevels 13, 17. Two coil springs 5, formed identically with mirror symmetry and winding around the bearing bolts 4 introduce into the end jaws 30 and into the middle jaws 31, in the closing direction, pretensioning forces that position the press tool in a self-holding manner on a fitting.

What is claimed is:

1. A press tool for connecting workpieces comprising:

a plurality of press jaws for exerting cold-forming forces on the workpieces, and at least one baring bolt connecting the press jaws and about which the press jaws pivot during the cold forming, wherein the press jaws have at least partially cylindrical inside surfaces, and wherein at least one of the at least partially cylindrical inside surfaces defines a widening recess in the form of a bevel adjacent an end face of the press jaw, the bevel being inclined at an angle relative to the at least partially cylindrical inside surface of the press jaw.

2. The press tool of claim 1 wherein the press tool is pretensioned in the closing direction.

3. The press tool of claim 2 wherein the press tool is pretensioned by a spring.

4. The press of tool of claim 3 wherein the spring is a coil spring.

5. The press tool of claim 1 wherein after connection of the workpieces end faces of the at least two press jaws are a distance apart from one another.

6. The press tool of claim 1 wherein the press jaws each have widths, and wherein the bevel is formed substantially across the width of the press jaw.

7. The press tool of claim 1, wherein the angle of the bevel is inclined relative to an imaginary line tangential to the at least partially cylindrical inside surface of the press jaw.

8. A press tool for connecting workpiece comprising:

a plurality of press jaws for exerting cold-forming forces on the workpieces, and at least one bearing bolt connecting the press jaws and about which the press jaws pivot during the cold forming, wherein the at least one bearing bolt is eccentric, wherein the press jaws have at least partially cylindrical inside surfaces, and wherein at least one of the at least partially cylindrical inside surfaces defines a widening recess in the form of a bevel adjacent an end face of the press jaw, the bevel being inclined at an angle relative to the at least partially cylindrical inside surface of the press jaw.

9. The press tool of claim 8 wherein the press tool is pretensioned in the closing direction.

10. The press tool of claim 9 wherein the press tool is pretensioned by a spring.

11. The press tool of claim 10 wherein the spring is a coil spring.

12. The press tool of claim 8 wherein after connection of the workpieces end faces of the at least two press jaws are a distance apart from one another.

13. A press tool for connection of workpieces comprising:

at least two press jaws for exerting cold-forming forces on the workpieces;

wherein at least one of the press jaws is connected in a hinged manner at one end and has, at the other end, an engagement region that receives the drive force required for the cold forming operation; and wherein the at least one press jaw is connected in the hinged manner at the one end by an eccentric bearing bolt about which the at least one press jaw pivots during the cold forming operation.

14. The press tool of claim 13 wherein the press tool is pretensioned in the closing direction.

15. The press tool of claim 14 wherein the press tool is pretensioned by a spring.

16. The press tool of claim 15 wherein the spring is a coil spring.

17. The press tool of claim 13 wherein after connection of the workpieces the end faces of the at least two press jaws are a distance apart from one another.

18. The press tool of claim 13 wherein the press jaws have at least partially cylindrical inside surfaces, and wherein at least one of the at least partially cylindrical inside surfaces defines a widening recess in the form of a bevel adjacent an end face of the press jaw, the bevel being inclined at an angle relative to an imaginary line tangent to the at least partially cylindrical inside surface of the press jaw.

* * * * *

UNITED STATES PATENT AND TRADEMARK OFFICE
CERTIFICATE OF CORRECTION

PATENT NO. : 6,694,586 B1
DATED : February 24, 2004
INVENTOR(S) : Hans-Joerg Goop It is certified that error appears in the above-identified patent and that said Letters Patent is hereby corrected as shown below:

Column 8,
Line 10, delete "baring" and insert -- bearing --
Line 34, delete "workpiece" and insert -- workpieces --

Signed and Sealed this

Twenty-eighth Day of September, 2004

JON W. DUDAS
*Director of the United States Patent and Trademark Office*